(12) United States Patent
Molz et al.

(10) Patent No.: US 11,609,967 B2
(45) Date of Patent: Mar. 21, 2023

(54) PLASMA GUN DIAGNOSTICS USING REAL TIME VOLTAGE MONITORING

(71) Applicant: OERLIKON METCO (US) INC., Westbury, NY (US)

(72) Inventors: Ronald J. Molz, Farmingville, NY (US); Dave Hawley, Westbury, NY (US); Samrawit Hermosillo, Santa Clara, CA (US); Jose Colmenares, Malverne, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 721 days.

(21) Appl. No.: 16/607,591

(22) PCT Filed: May 24, 2018

(86) PCT No.: PCT/US2018/034387
§ 371 (c)(1),
(2) Date: Oct. 23, 2019

(87) PCT Pub. No.: WO2018/218021
PCT Pub. Date: Nov. 29, 2018

(65) Prior Publication Data
US 2020/0151239 A1 May 14, 2020

Related U.S. Application Data

(60) Provisional application No. 62/510,999, filed on May 25, 2017.

(51) Int. Cl.
*H05H 1/34* (2006.01)
*G06F 17/14* (2006.01)
*G01F 1/66* (2022.01)

(52) U.S. Cl.
CPC ............. *G06F 17/142* (2013.01); *H05H 1/34* (2013.01); *G01F 1/66* (2013.01); *H05H 1/3494* (2021.05)

(58) Field of Classification Search
CPC ...... G06F 17/142; H05H 1/34; H05H 1/3494; H05H 1/42; H05H 1/36; G01F 1/66;
(Continued)

(56) References Cited

U.S. PATENT DOCUMENTS 5,543,689 A * 8/1996 Ohta ................... H01J 37/3299
315/111.41
5,756,960 A 5/1998 Rogozinski et al.
(Continued)

FOREIGN PATENT DOCUMENTS

CN 1266391 9/2000
CN 1270684 10/2000
(Continued)

OTHER PUBLICATIONS

Europe Search Report/Office Action conducted in counterpart Europe Appln. No. EP 18805270 (dated Jan. 28, 2021).
(Continued)

*Primary Examiner* — Jimmy Chou
*Assistant Examiner* — Yi Hao
(74) *Attorney, Agent, or Firm* — Greenblum & Bernstein, P.L.C.

(57) ABSTRACT

Method and apparatus for monitoring and diagnosing gun performance is derived that can determine proper gun operation and if not operating properly diagnose potential causes for abhorrent operation. The voltage produced by the gun is sampled in real time and the frequency spectrum produced analyzed using FFT and then reducing the FFT pattern down to a set of numerical values or a signature that can be compared to known signatures for both correct operation
(Continued)

and abnormal operation. Using best fit techniques the cause of any abnormal behavior can then be identified. The method can also be used to predict the end of hardware life and aid in production scheduling and spare parts acquisition by providing advanced notice of wear and usage.

17 Claims, 7 Drawing Sheets

(58) Field of Classification Search
CPC ..... B05B 7/226; B05B 12/004; B23K 10/006; G01N 29/14; G01N 29/46
See application file for complete search history.

(56) References Cited

U.S. PATENT DOCUMENTS

| | | | | |
|---|---|---|---|---|
| 5,844,196 | A * | 12/1998 | Oakley | B23K 10/006 219/124.02 |
| 6,008,464 | A | 12/1999 | Donnart et al. | |
| 6,291,999 | B1 * | 9/2001 | Nishimori | H05H 1/46 324/464 |
| 6,745,095 | B1 * | 6/2004 | Ben-Dov | H01L 22/26 700/121 |
| 2003/0178140 | A1 * | 9/2003 | Hanazaki | H01J 37/32935 118/712 |
| 2004/0175913 | A1 * | 9/2004 | Johnson | H01J 37/32963 438/610 |
| 2006/0032287 | A1 | 2/2006 | Strang et al. | |
| 2007/0294608 | A1 | 12/2007 | Winterhalter et al. | |
| 2010/0176085 | A1 | 7/2010 | Mizukami et al. | |
| 2012/0234803 | A1 | 9/2012 | Liu et al. | |
| 2014/0033801 | A1 * | 2/2014 | Sinha | H01M 8/04686 73/40 |
| 2015/0001193 | A1 | 1/2015 | Mao et al. | |
| 2016/0268108 | A1 * | 9/2016 | Daniels | H01J 37/32935 |
| 2016/0356747 | A1 | 12/2016 | Cybulsky et al. | |
| 2018/0061681 | A1 * | 3/2018 | Koshimizu | H01L 21/67103 |

FOREIGN PATENT DOCUMENTS

| | | | |
|---|---|---|---|
| CN | 1665634 | 9/2005 | |
| CN | 102473593 | 5/2012 | |
| CN | 102856149 | 1/2013 | |
| CN | 102986305 | 3/2013 | |
| CN | 103999309 | 8/2014 | |
| CN | 104981270 | 10/2015 | |
| DE | 19756445 | 2/1999 | |
| DE | 19756445 A1 * | 2/1999 | ............ B23K 10/00 |
| EP | 2594119 | 5/2013 | |
| JP | 2016-170897 | 9/2016 | |
| WO | 2012/009634 | 1/2012 | |

OTHER PUBLICATIONS

Int'l Search Report (Form PCT/ISA/210) conducted in Int'l Appln. No. PTO/US18/34387 (dated Aug. 22, 2018).

Int'l Written Opinion (Form PCT/ISA/237) conducted in Int'l Appln. No. PTO/US18/34387 (dated Aug. 22, 2018).

Translation of China Search Report/Office Action conducted in counterpart China Appln. No. CN 201880030606.6 (dated Sep. 27, 2021).

Translation of Second China Search Report/Office Action conducted in counterpart China Appln. No. CN 201880030606.6 (dated Jul. 6, 2022).

* cited by examiner

PLASMA GUN DIAGNOSTICS USING REAL TIME VOLTAGE MONITORING

CROSS-REFERENCE TO RELATED APPLICATION

This application claims the benefit under 35 U.S.C. § 119(e) of U.S. Provisional Patent Application No. 62/510,999 filed May 25, 2017, the disclosure of which is expressly incorporated by reference herein in its entirety.

BACKGROUND OF THE INVENTION

1. Field of the Invention

Embodiments of the invention are directed to a method for monitoring plasma gun behavior to prevent improper operation of the plasma gun and/or damage to the plasma gun. In particular, the method can be used to inform the operator of impending improper spraying and/or impending gun failure.

2. Discussion of Background Information

Thermal Spray plasma guns use an electrode (cathode) and a nozzle (anode) to create a plasma arc through which a gas is passed and ionized to produce a plasma plume. Powder is injected into the plume to heat and accelerate the particles onto a substrate to form a coating. The gun is water cooled to prevent the components from melting. Over time, the cathode and anode wear from the extreme conditions and the performance of the plasma gun degrades until it is necessary to replace the gun hardware. In addition, problems can develop with the gun operation due to the following causes:
1. The gun can be incorrectly assembled, resulting in a water leak that affects the plasma arc or the plume depending upon where the leak occurs;
2. The gun can be assembled with the wrong nozzle and/or electrode resulting in incorrect plume energy;
3. A component or part in the gun can be defective. Often, these defects are not clearly visible at the time of gun assembly;
4. The gas used in the plasma gun is contaminated, and/or is possibly the wrong gas;
5. The equipment used to regulate the flow of gas to the plasma gun becomes out of calibration or malfunctions; and
6. For manually operated equipment, the wrong gas flows or operating parameters can be set.

Any of these conditions including gun hardware wear will likely result in the coating being out of specification, e.g., the desired properties such as porosity, hardness, or coating thickness can be incorrect. Since this is not detected until after the coating process is complete, the ramifications can be quite expensive. At the least the coating will have to be stripped off and re-applied. In a worst case, the part, which can have a value exceeding $100,000, may have to be scrapped entirely.

Historically, an operator was either trained to know or learned when to replace the gun hardware or to recognize something was wrong based on observing the gun voltage, the plume stability, and/or listening for changes in the sound produced by the gun. The techniques varied depending upon the gun, the operator, and the operating parameters. With the introduction of more automated equipment, the operator is now more distant from the process and thus loses that sense of gun operation.

Previous developments for monitoring the process have included, via optical sensing, imaging the plasma plume and powder injection to ascertain if the plume intensity and powder energy (kinetic and thermal) are within expected ranges. This can only be done by moving the plasma gun to a fixed location where the plume can be imaged after the gun is started and prior to spraying. While this method can detect many of the potential problems associated with the gun operation it has two main drawbacks:
1. As the plume is only observed prior to spraying, the method cannot monitor the gun during spraying itself. Thus, long spray runs, the method is limiting; and
2. The method adds time to the overall coating process and therefore wastes valuable powder material, the cost of which can exceed several hundred dollars per pound.

As a result, the method of optical imaging is only used with very expensive spray processes and parts where the added costs in time and money can be justified.

Recent developments have incorporated the use of sound measurements to measure the plasma gun behavior in an attempt to determine when the hardware was wearing to the point requiring replacement, see U.S. Patent Publication No. 2016/0356747, the disclosure of which is expressly incorporated by reference herein in its entirety. This concept is based on the ability of operators and those with experience operating thermal spray plasma guns to be able to tell if the hardware and gun were working properly purely by the sound the gun makes. The implementation requires adding sound sensing technology and acoustical processing to the process control. While this method does address the problem of being able to monitor the gun in-situ during actual spraying, it has limitations:
1. The sound meters are not ideally suited for the dusty spray environment and their longevity may be short, requiring constant monitoring and cleaning;
2. The sound emanating from the gun will interact with the booth resulting in reverberation that will affect the sound readings while the gun is in motion; and
3. As each booth has a unique sound signature, each booth will have to be individually calibrated with each gun parameter to prevent sound signatures from being shared between booths or locations. It is not unusual for large applications to have as many as a dozen spray booths operating with the same gun, gun hardware, and spray parameter.

SUMMARY OF THE EMBODIMENTS

What is needed in the art is a more direct way to measure the gun behavior, e.g., during spraying, without adding complexity to the system. Ideally, this method should be independent of the spray booth or system used to operate the gun.

Plasma controllers provide a way to measure gun voltage either at the plasma gun or at a junction box in proximity to the gun. As this voltage measurement is recorded and displayed only once or twice a second, a slow response for ease of reading the signal is presented. This can be the basis for determining the gun voltage and does not reflect the real time dynamics of the actual gun voltage oscillations and instabilities.

In embodiments, a method and apparatus for monitoring and diagnosing gun performance is derived that can determine proper gun operation and, if not operating properly, diagnose potential causes for abhorrent operation. The voltage produced by the gun can be sampled in real time and the frequency spectrum produced analyzed using frequency analysis, e.g., a Fast Fourier Transform (FFT) and then reducing the FFT pattern down to a set of numerical values or a signature that can be compared to known signatures for both correct operation and abnormal operation. Using best fit techniques, the cause of any abnormal behavior can then be identified. The method can also be used to predict an end of hardware life and aid in production scheduling and spare parts acquisition by providing advanced notice of wear and usage.

Modern control systems including PLC's and Industrial PC's can read analog input signals at sufficiently high rates to permit frequency analysis of the signal. By doing so, the real voltage characteristics and behavior can be measured and determined.

It is then possible to monitor the gun voltage at a higher sampling rate so that the voltage pattern can be defined and analyzed to determine the condition of the gun.

Embodiments of the invention are directed to a method for monitoring behavior of a plasma gun having a process controller. The method includes sampling a gun voltage of the plasma gun; analyzing the sampled gun voltage; identifying amplitude peaks; producing a pattern representing the identified amplitude peaks; and comparing the produced pattern to stored known patterns. When the comparing indicates that the behavior of the plasma gun is abnormal, a corrective action is performed.

According to embodiments, the sampling, analyzing, identifying, producing and storing can be performed separately from the process controller. Alternatively, the sampling, analyzing, identifying, producing and storing may be performed in the process controller.

In accordance with other embodiments, the process controller can perform the corrective action.

In other embodiments, the stored known patterns may include at least a set of known normal operation patterns and a set of known abnormal operation patterns. Further, a data recorder can compare the produced pattern to known normal operation patterns in the set of known normal operation patterns. When the produced pattern corresponds to a known normal operation pattern, the behavior of the plasma gun can be indicated as normal and the method may be repeated. Still further, when the produced pattern does not correspond to any of the known normal operation patterns in the set of known normal operation patterns, the data recorder may compare the produced pattern to known abnormal operation patterns in the set of known abnormal operation patterns. When the produced pattern corresponds to a known abnormal operation pattern, the behavior of the plasma gun can be indicated as abnormal and the correct action is transmitted to the process controller. Moreover, as each stored known abnormal operation pattern can be associated with a known cause of abnormal operation and a corrective action to return operation to normal, the method can also include that, when the produced pattern corresponds to the known abnormal operation pattern, the data recorder can provide the corrective action to the process controller to return the behavior of the plasma gun to normal operation.

According to still other embodiments, the method can be performed at least one of before, during and after a use of the plasma gun.

In accordance with other embodiments, the producing of the pattern representing the identified amplitude peaks can include determining a total area of an identified amplitude peak, determining a frequency and amplitude of the identified peak at maximum amplitude, determining a frequency and amplitude of the identified peak at 50% of the total area of the identified peak, determining a frequency and amplitude of the identified peak at 10% of the total area of the identified peak, and determining a frequency and amplitude of the identified peak at 90% of the total area of the identified peak.

In other embodiments, the sampling of the gun voltage can be performed in real time.

In still other embodiments, the analyzing voltage can include performing a fast Fourier transform on the sampled gun voltage.

Embodiments of the invention are directed to an apparatus for monitoring behavior of a plasma gun. The apparatus includes a process controller structured and arranged to control operational parameters of the plasma gun; a voltage sensor structured and arranged to sample a gun voltage of the plasma gun; a data processor configured to analyze the sampled gun voltage, to identify amplitude peaks, and to produce a pattern representing the identified amplitude peaks; a memory configured to store known gun operating patterns; and a comparer configured to compare the produced pattern to the stored known gun operating patterns. When the comparing indicates that the behavior of the plasma gun is abnormal, the process controller is instructed to perform a corrective action.

According to embodiments, the stored known gun operating patterns can include at least a set of known normal operation patterns and a set of known abnormal operation patterns. Moreover, a data processor may be configured to compare the produced pattern to known normal operation patterns in the set of known normal operation patterns so that, when the produced pattern corresponds to a known normal operation pattern, the behavior of the plasma gun can be indicated as normal. Further, when the produced pattern does not correspond to any of the known normal operation patterns in the set of known normal operation patterns, the data processor may be configured to compare the produced pattern to known abnormal operation patterns in the set of known abnormal operation patterns so that, when the produced pattern corresponds to a known abnormal operation pattern, the behavior of the plasma gun may be indicated as abnormal and the correct action is transmitted to the process controller. Still further, each stored known abnormal operation pattern is associated with a known cause of abnormal operation and a corrective action to return operation to normal so that, when the produced pattern corresponds to the known abnormal operation pattern, the data processor may provide the corrective action to the process controller to return the behavior of the plasma gun to normal operation.

According to other embodiments, the apparatus may be configured to monitor plasma gun behavior at least one of before, during and after a use of the plasma gun.

In accordance with still yet other embodiments of the present invention, the data processor may at least one of: be configured to execute a program to analyze the sampled gun voltage; and be configured to execute firmware of digital signal processors to analyze the sampled gun voltage. Further, the pattern representing the identified amplitude peaks may be produced by determining a total area of an identified amplitude peak, determining a frequency and amplitude of the identified peak at maximum amplitude, determining a frequency and amplitude of the identified peak at 50% of the total area of the identified peak, determining a frequency and amplitude of the identified peak at 10% of the total area of the identified peak, and determining a frequency and amplitude of the identified peak at 90% of the total area of the identified peak.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
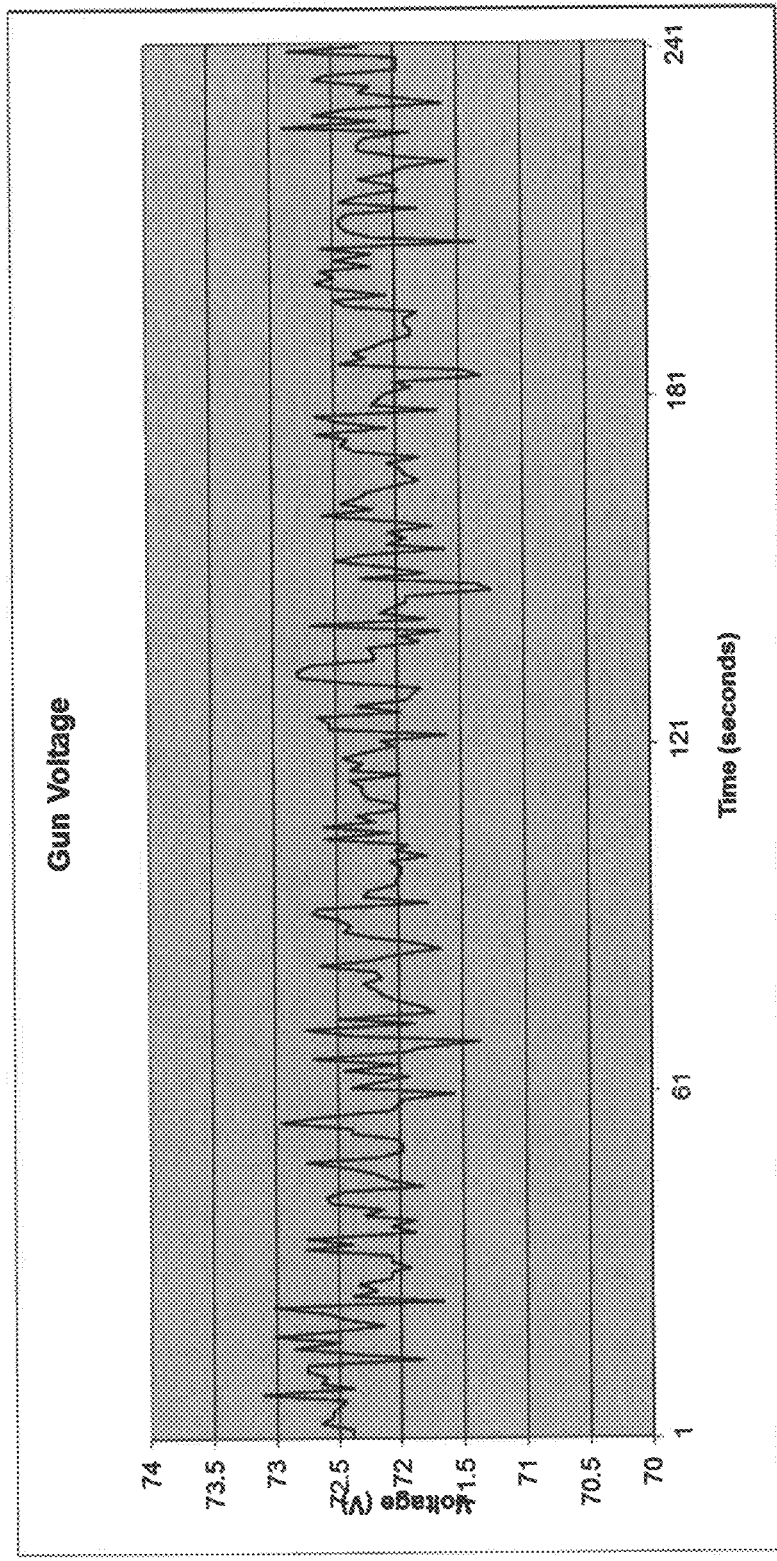
FIG. 1 illustrates a voltage trace of F4 gun taken once per second with new gun hardware.
Figure 2:
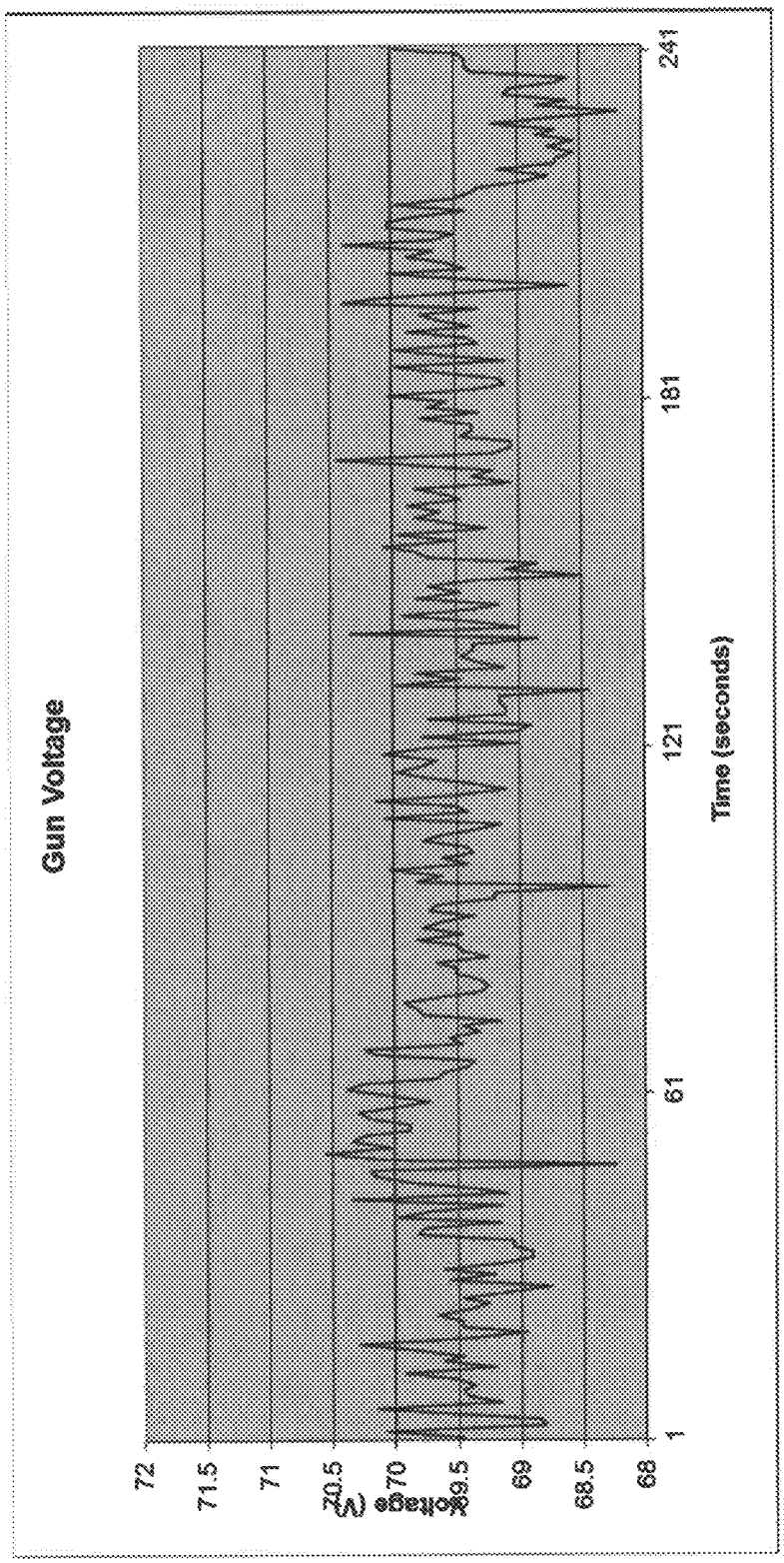
FIG. 2 illustrates a voltage trace of F4 gun taken once per second with used hardware.

Even at low sampling rates, changes in voltage resulting from gun hardware wear are easily discernible. As an example, FIG. 1 shows the gun voltage for an Oerlikon Metco F4 MB-XL plasma gun after an hour of operation with a newly installed electrode (cathode) and nozzle (anode), FIG. 2 shows the same gun and hardware after 17 hours of operation, whereby the hardware is near the end of its life. It is clear that the voltage behavior even at lower sampling rates, is distinctly different.

Each plasma gun and hardware set (nozzle and electrode) has a distinct voltage behavior in terms of frequencies produced from various oscillations. These oscillations are derived from the following physical conditions arranged from highest to lowest frequency:

1. Natural acoustics inside the gun which range in frequency from 17,000 to 60,000 Hertz as measured to date;
2. The oscillation of the plasma arc inside the gun bore which ranges in frequency from 1,500 to 8,500 Hertz depending upon the type of gun, the gun hardware, and the operating parameters;
3. Power supply ripple induced from the power supply silicon controlled rectifiers (SCRs) switching at 300 to 360 Hertz depending upon the incoming 3-phase electric frequency; and
4. Oscillations produced by surface discontinuities that develop and change inside the nozzle bore over time and can vary from 0.5 Hertz to as high as a few hundred Hertz. These low frequency oscillatory patterns are readily seen in typical voltage pickups in conventional plasma controllers, as depicted in FIGS. 1 and 2.

Figure 3:
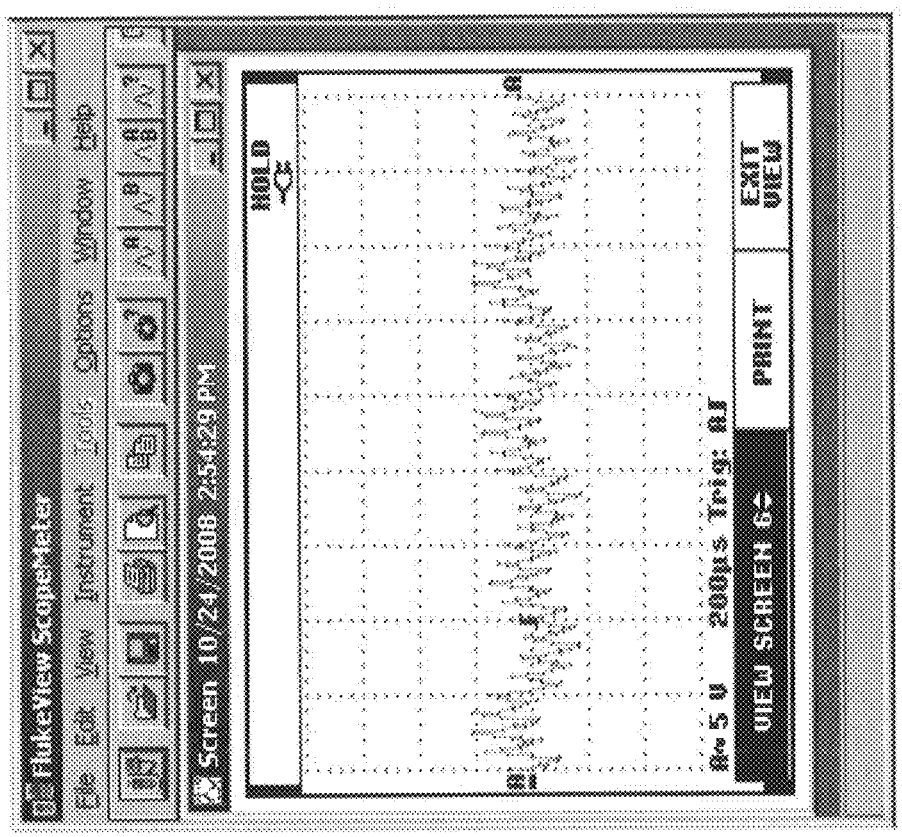
FIG. 3 illustrates a voltage trace of an F4 plasma gun showing two primary oscillations at 4,613 Hz and ~50,000 Hz.

FIG. 3 shows an example of an oscilloscope trace of an F4 plasma gun voltage with a standard electrode and 6 mm nozzle in operation with a typical argon/hydrogen parameter. Two primary frequencies are evident: the highest frequency and smaller amplitude oscillation is around 50,000 Hertz and the second lower frequency and larger amplitude oscillation measured at 4,613 Hertz. These oscillations correspond to the acoustical conditions inside the bore and plasma arc motion.

Figure 4:
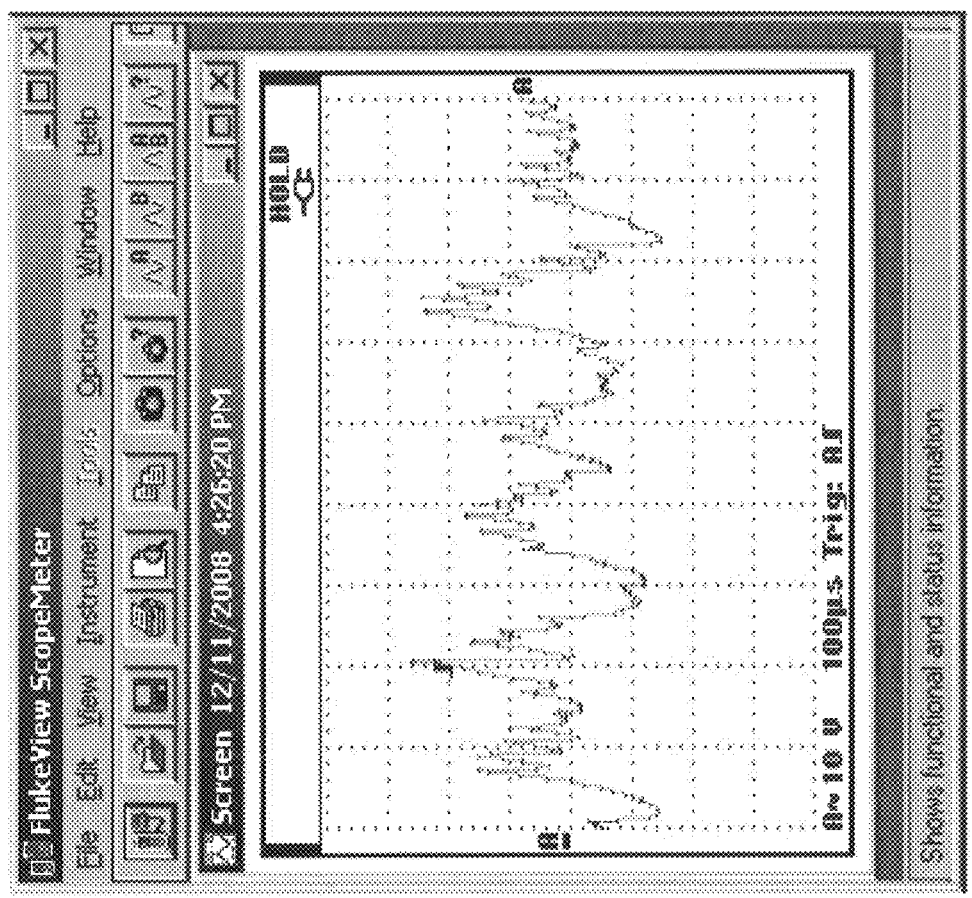
FIG. 4 illustrates a voltage trace of Triplex Pro 210 Plasma gun showing two primary, oscillations at ~2500 Hz and ~25,000 Hz.

FIG. 4 shows an example of an oscilloscope trace of an Oerlikon Metco Triplex Pro 210 plasma gun voltage with a 9 mm nozzle in operation with a typical argon/helium parameter. Again two primary frequencies are evident: the highest frequency and smaller amplitude oscillation is around 25,000 Hertz and the second lower frequency and larger amplitude oscillation is around 2,500 Hertz. Again these oscillations correspond to the acoustical conditions inside the bore and plasma arc motion.

The examples shown in FIGS. 3 and 4 show how the range of frequencies for the various oscillations can vary widely and are unique to each gun, each type of hardware set, and even the gases used, which allow for ready identification. The same generally holds true for changing conditions such as wear or other causes of gun operating performance issues previously defined.

To implement real time plasma gun voltage monitoring requires the plasma controller or a separate monitoring device to have an analog input that can provide at least 1 digitized sample a second, preferably 10,000 samples a second and most preferably 100,000 samples a second. A single sample per second will limit the ability to detect gun wear only, while 10,000 samples per second will enable additional diagnostics related to the plasma arc motion, and 100,000 samples a second will enable the full range of diagnostics including conditions that affect the gun acoustics such as gases and gas flows.

Figure 5:
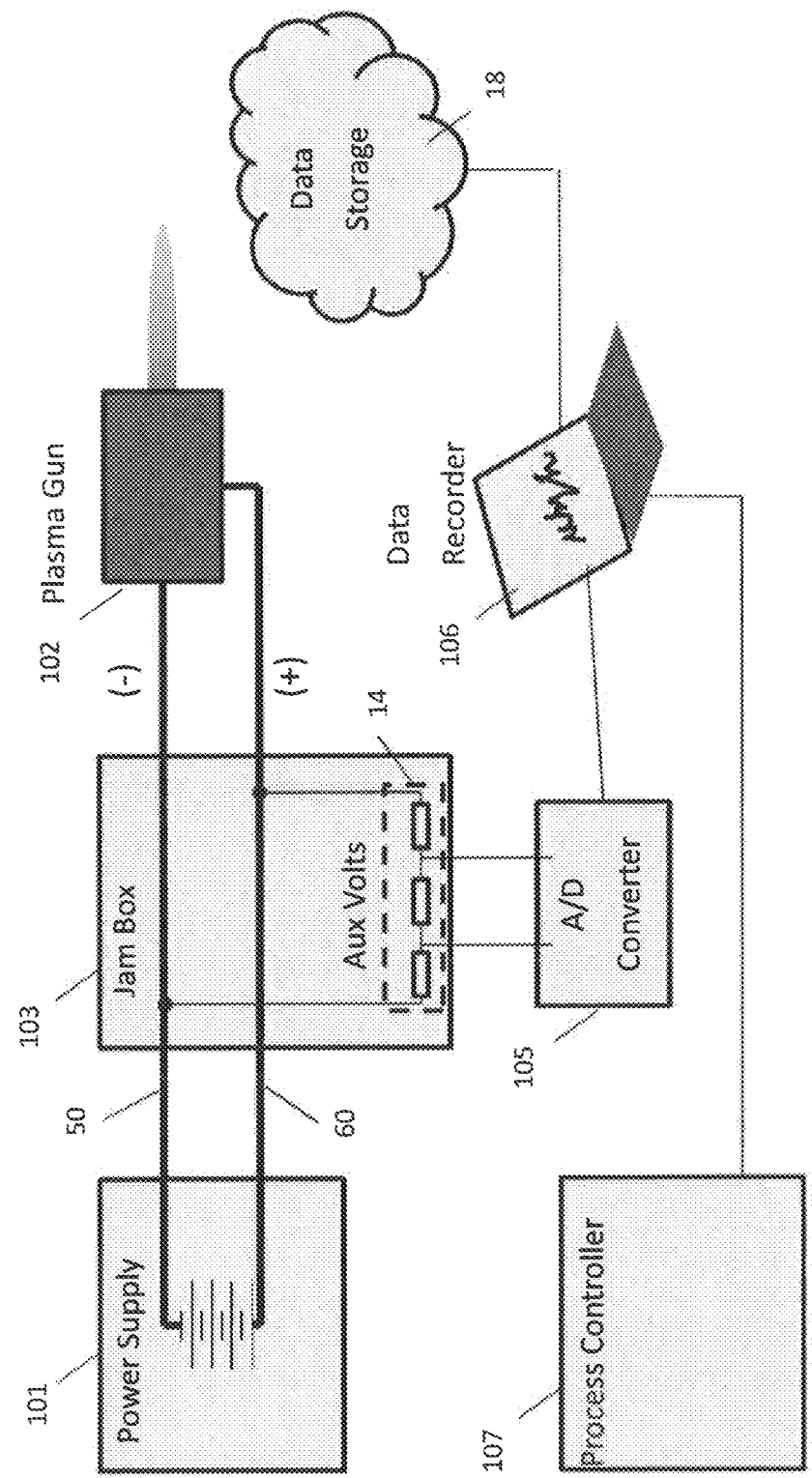
FIG. 5 illustrates a hardware setup for acquiring voltage data.

FIG. 5 shows one example of a voltage data acquisition setup 100 using a separate monitoring device in communication with the plasma process controller 107. An auxiliary voltage pickup is used in the jambox to acquire and then digitize the voltage as a sample stream and recorded in a data recording device. Electrical power is supplied from power supply 101 to plasma gun 102 via jam box 103, which serves as a point where electrical power and water are joined to the gun and monitored. In the illustrated example, a voltage between electrical lines 50 and 60 is acquired/read by an auxiliary voltage pickup 14, e.g., a voltage divider, and then digitized in an A/D converter 105, whereby the voltage produced by the gun is sampled in real time as a sample stream for analysis and recorded in a data recorder 106. It is to be understood that voltage pickup 14 can also be located at the power supply, preferably at the jam box, and most preferably at the gun without departing from the spirit and scope of the embodiments of the invention. The frequency spectrum of the sampled voltage can be analyzed using frequency analysis, e.g., a Fast Fourier Transform (FFT), and the FFT pattern can then be reduced down to a set of numerical values or a signature that can be compared to known signatures for both correct operation and abnormal operation. While custom analytical software can be designed and implemented by those ordinarily skilled in the art to achieve the above-described set of numerical values or signatures, it is understood that existing analytical data applications for performing signal analysis, such as LabVIEW from National Instruments® or MATLAB® can be employed to produce patterns in accordance with embodiments of the invention. Alternatively, it is also understood that, in lieu of using software applications to perform the analytical work, dedicated digital signal processor (DSP) firmware can be provided in the processing chips without departing from the spirit and scope of the embodiments of the invention.

The known signatures can be stored e.g., in data storage 18 for retrieval by data recorder 106. Data storage 18 can be maintained in a centralized storage location, such as, e.g., a web based server (cloud) or on-site servers to be implemented on each local system. Moreover, it is to be understood that the database of patterns residing in the local systems can be updated from a central source (e.g., a web based server/cloud) without departing from the spirit and scope of the embodiments of the invention.

Using best fit techniques, a high correlation between the FFT pattern and a known signature, e.g., 70% or greater, can identify proper operation or the cause of any abnormal behavior. The solution to an identified cause of abnormal behavior can also be stored in data storage 18 and retrieved by data recorder 106 when the abnormal behavior is identified. Data recorder 106 can also be connected to plasma process controller 107, which controls power supply 101 and jam box 103 in order to control the plasma gun process. It is also to be understood that plasma process controller 107 can be incorporated within data recorder 106 without departing from the spirit and scope of the embodiments of the invention. Thus, when a solution to an identified abnormal behavior is retrieved by data recorder 106, this solution can be forwarded to process controller 107 to implement the solution to return the plasma gun operation to normal. Further, while voltage data acquisition and analysis can be done with a separate device, as shown in exemplary FIG. 5, it is to be understood that this process can also be integrated directly into the process controller or even in a motion control system, e.g., a robot, without departing from the spirit and scope of the claimed embodiments.

Figure 6:
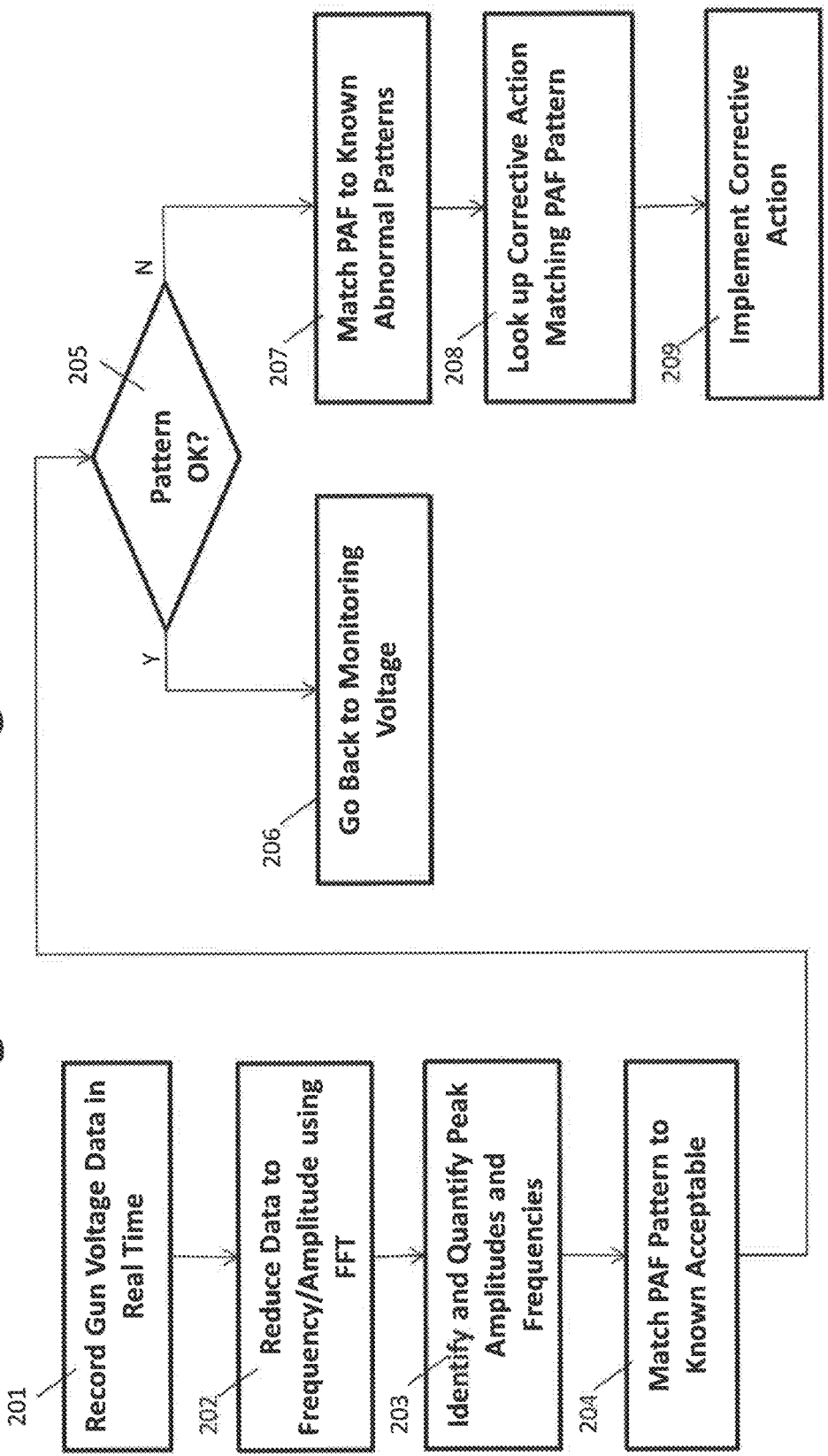
FIG. 6 illustrates a flow diagram of an exemplary method for acquiring and analyzing voltage data.

FIG. 6 shows a flow diagram of an exemplary method for acquiring and processing the data. In the exemplary method, gun voltage data is recorded in real time at 201. This recorded gun voltage data can be a sample stream produced by digitizing the analog gun voltage monitored, e.g., in a jam box. Further, the analog gun voltage can be monitored during initial startup of the gun, during spraying to provide in-situ monitoring of the plasma gun, and/or after the gun has finished spraying. The digitized voltage sample stream is fed at 202 to the data recording device, where a frequency analysis algorithm, e.g., a Fast Fourier Transform (FFT), is performed to create a frequency/amplitude plot. At 203, key amplitude peaks are identified and reduced to a set of values defining the size and shape of the peaks, thereby producing a pattern representing the peaks, as shown, e.g. in FIG. 7. Key amplitude peaks include those associated with the oscillations described, and in particular the acoustics oscillation and plasma arc oscillation. Preferably, the voltage pattern is monitored continuously from the moment the gun is started to the time at which the gun is shut down. For in-situ monitoring, the data capture and reduction can occur on a continuous basis or more preferably at discrete time intervals short enough to capture undesired behaviors before they can result in bad sprayed parts or even gun damage. Continuous monitoring would utilize a moving stream of voltage data over time and can be rather computationally intensive, requiring dedicated processors, e.g., digital signal processors (DSPs). Discrete time intervals are more preferred and can range from as short as once per second to as long as once every 30 seconds with the preferred interval in the 3 to 5 second range. The 3-5 second updates make it possible to detect impending gun failures such as water leaks and the onset of gun spitting due to overheating or wear before serious damage is done to the gun or the sprayed part.

The peak amplitude and frequency pattern acquired for the gun under test are compared at 204 to known patterns stored in the data storage for gun operation. Initial implementation of pattern matching will be to first identify normal operating voltage patterns for each gun, hardware set, and parameter used in order to determine if the gun is operating correctly. Known patterns, for acceptable/normal operation and for abnormal operation, may be loaded into the data storage (e.g., the cloud or local database) for future reference and comparison to the pattern acquired from the gun under test. Loading data into an open platform such as the "cloud" would enable other systems to access this information and allow sharing of voltage pattern experience as patterns are loaded and made available. As abnormal conditions are detected and voltage patterns obtained of these abnormal conditions they can also be loaded to further the implementation.

Once a voltage pattern is obtained it can be compared at 205 to known acceptable patterns stored in the data storage that have been collected over time to verify if the pattern represents a normal pattern for the parameter. When the pattern corresponds to a known normal pattern, e.g., at least 70% correlation between the pattern under test and a known normal pattern, i.e., Y at 205, the process deems the tested pattern acceptable and, at 206, the process returns to the beginning of the process to monitor the gun voltage at 201. If the pattern does not correspond to a known normal pattern, i.e., N at 205, the peak amplitude and frequency of the pattern are compared at 207 to known abnormal patterns, which can also be stored in the data storage, to find a corresponding known abnormal pattern, e.g., at least 70% correlation between the pattern under test and a known abnormal pattern. When a match to a known abnormal pattern is found, the cause of the abnormality can be ascertained, as well as corrective action to address and overcome the abnormal operation, can be found at 208. The causes associated with the known abnormal patterns and the corrective actions for overcome such abnormal patterns can be stored in the data storage. At 209, the cause and corrective action can then be relayed to the process controller, which can be separate from or incorporated within the data processing system, to implement the corrective action. If the data processing is separate from the process controller as shown in FIG. 5.

Figure 7:
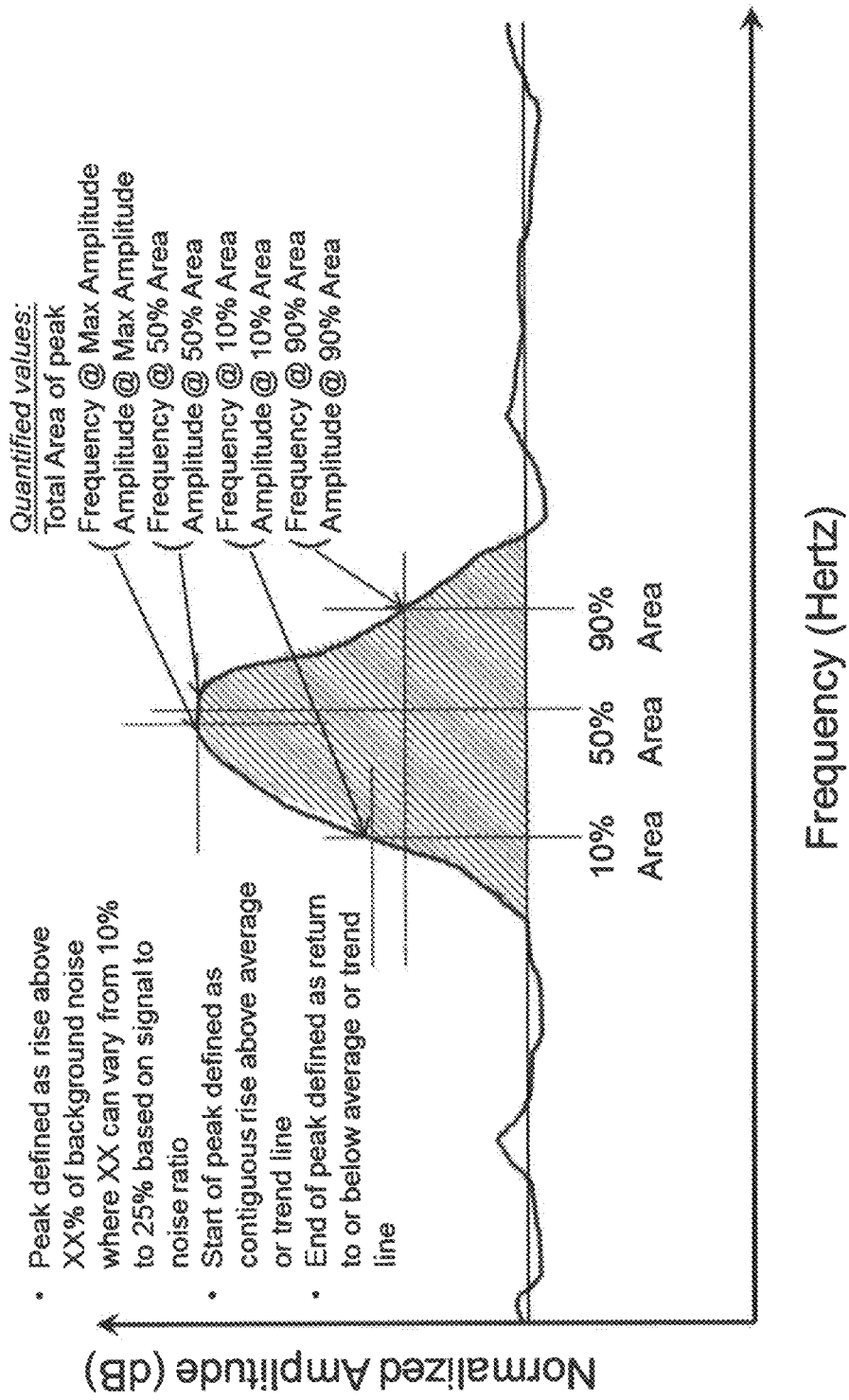
FIG. 7 illustrates a diagram showing reducing a frequency amplitude peak of an FFT trace to a set of values defining the size and shape of the peak.

With reference to FIG. 7, key amplitude peak for examination is shown. A key peak can be defined, based on signal to noise ratio, as a peak rising above background noise, e.g., at least 10% above background noise and preferably between 10% and 25% above background noise. A start of the key peak can be designated as a contiguous rise above the average or trend line and an end of the key peak can be designated as a return to or below average or trend line. As shown in the exemplary figure, the key peak can be reduced to a set of values defining the size and shape of the peaks.

By way of example, certain quantified values can be recorded, e.g., total area of the peak above the average or trend line; the frequency and amplitude at the maximum amplitude; frequency and amplitude at 50% of the total area of the peak; frequency and amplitude at 10% of the total area of the peak; and frequency and amplitude at 90% of the total area of the peak. These values can be used to produce a pattern representing the peak for comparison to the known normal and, if necessary, known abnormal conditions in accordance with the above-described embodiments.

New or unique patterns not on file in the data storage would require identifying the cause of the pattern and then uploading that pattern and information into the data bank to add to the collection of known patterns. As more patterns are identified and loaded into the data bank, the ability to diagnose and correct for more abnormal conditions increases.

An example of this method would have an existing abnormal pattern loaded into the data bank representing the voltage behavior when there is a water leak in a defined gun and hardware set. When that pattern is detected during a spray event corresponding to an actual water leak it could then be quickly identified and the gun shut down before causing damage to the gun or producing a bad coating.

Another example of this method would have an external voltage pattern corresponding to a shift in secondary gas flow loaded into the data bank. During operation, an abnormal pattern is detected and, when matched to the data bank, alerts the operator of the possible shift and if sufficient pattern mapping is present, recommends adjusting the secondary gas flow to correct for the abnormality.

Further, the method and apparatus according to embodiments of the invention can be applied to any plasma thermal spray system and to any similar plasma devices, such as those for processing materials or those serving as plasma generators for simulating space environments and ozone generators. It is also to be understood that the methods according to embodiments of the invention can apply different techniques to reduce the frequency/amplitude peaks to distinct values representing the shape and size of the peaks.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation, Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for monitoring behavior of a plasma gun having a process controller, the method comprising:
    sampling a gun voltage of the plasma gun;
    analyzing the sampled gun voltage;
    identifying amplitude peaks in the analyzed sampled gun voltage;
    producing a pattern representing the identified amplitude peaks; and
    comparing the produced pattern to stored known patterns,
    wherein, when the comparing indicates that the behavior of the plasma gun is abnormal, a corrective action is performed, and
    wherein the producing of the pattern representing the identified amplitude peaks comprises determining a total area of an identified amplitude peak, determining a frequency and amplitude of the identified peak at maximum amplitude, determining a frequency and amplitude of the identified peak at 50% of the total area of the identified peak, determining a frequency and amplitude of the identified peak at 10% of the total area of the identified peak, and determining a frequency and amplitude of the identified peak at 90% of the total area of the identified peak.

2. The method according to claim 1, wherein the sampling, analyzing, identifying, producing and storing are performed separately from the process controller.

3. The method according to claim 1, wherein the sampling, analyzing, identifying, producing and storing are performed in the process controller.

4. The method according to claim 1, wherein the process controller performs the corrective action.

5. The method according to claim 1, wherein the stored known patterns include at least a set of known normal operation patterns and a set of known abnormal operation patterns.

6. The method according to claim 5, wherein a data recorder compares the produced pattern to known normal operation patterns in the set of known normal operation patterns, and
    wherein, when the produced pattern corresponds to a known normal operation pattern, the behavior of the plasma gun is indicated as normal and the method is repeated.

7. The method according to claim 6, wherein, when the produced pattern does not correspond to any of the known normal operation patterns in the set of known normal operation patterns, the data recorder compares the produced pattern to known abnormal operation patterns in the set of known abnormal operation patterns, and
    wherein, when the produced pattern corresponds to a known abnormal operation pattern, the behavior of the plasma gun is indicated as abnormal and the correct action is transmitted to the process controller.

8. The method according to claim 6, wherein each stored known abnormal operation pattern is associated with a known cause of abnormal operation and an associated corrective action to return operation to normal, and the method further comprises,
    when the produced pattern corresponds to the known abnormal operation pattern, the data recorder provides the associated corrective action to the process controller to return the behavior of the plasma gun to normal operation.

9. The method according to claim 1 being performed at least one of before, during and after a use of the plasma gun.

10. The method according to claim 1, wherein the sampling of the gun voltage is performed in real time.

11. The method according to claim 1, wherein the analyzing voltage comprises performing a fast Fourier transform on the sampled gun voltage.

12. An apparatus for monitoring behavior of a plasma gun, comprising:
    a process controller structured and arranged to control operational parameters of the plasma gun;
    a voltage sensor structured and arranged to sample a gun voltage of the plasma gun;

a data processor configured to analyze the sampled gun voltage, to identify amplitude peaks, and to produce a pattern representing the identified amplitude peaks;

a memory configured to store known gun operating patterns; and a comparer configured to compare the produced pattern to the stored known gun operating patterns, wherein, when the comparing indicates that the behavior of the plasma gun is abnormal, the process controller is instructed to perform a corrective action, wherein the data processor at least one of:

is configured to execute a program to analyze the sampled gun voltage; and is configured to execute firmware of digital signal processors to analyze the sampled gun voltage, and wherein the pattern representing the identified amplitude peaks is produced by determining a total area of an identified amplitude peak, determining a frequency and amplitude of the identified peak at maximum amplitude, determining a frequency and amplitude of the identified peak at 50% of the total area of the identified peak, determining a frequency and amplitude of the identified peak at 10% of the total area of the identified peak, and determining a frequency and amplitude of the identified peak at 90% of the total area of the identified peak.

13. The apparatus according to claim 12, wherein the stored known gun operating patterns include at least a set of known normal operation patterns and a set of known abnormal operation patterns.

14. The apparatus according to claim 13, wherein the produced pattern is compared to known normal operation patterns in the set of known normal operation patterns, and wherein, when the produced pattern corresponds to a known normal operation pattern, the behavior of the plasma gun is indicated as normal.

15. The apparatus according to claim 14, wherein, when the produced pattern does not correspond to any of the known normal operation patterns in the set of known normal operation patterns, the produced pattern is compared to known abnormal operation patterns in the set of known abnormal operation patterns, and wherein, when the produced pattern corresponds to a known abnormal operation pattern, the behavior of the plasma gun is indicated as abnormal and the correct action is transmitted to the process controller.

16. The apparatus according to claim 14, wherein each stored known abnormal operation pattern is associated with a known cause of abnormal operation and an associated corrective action to return operation to normal, and wherein, when the produced pattern corresponds to the known abnormal operation pattern, the associated corrective action is provided to the process controller to return the behavior of the plasma gun to normal operation.

17. The apparatus according to claim 12 being configured to monitor plasma gun behavior at least one of before, during and after a use of the plasma gun.

* * * * *